(12) United States Patent
Sterbling et al.

(10) Patent No.: US 12,423,335 B2
(45) Date of Patent: Sep. 23, 2025

(54) DATA OBJECT GRAPH ENHANCEMENT FRAMEWORK

(71) Applicant: SAP SE, Walldorf (DE)

(72) Inventors: Sven Sterbling, Heidelberg (DE); Nicolas Schaefer, Mannheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/516,720

(22) Filed: Nov. 21, 2023

(65) Prior Publication Data
US 2025/0165506 A1    May 22, 2025

(51) Int. Cl.
*G06F 16/28* (2019.01)
*G06F 16/22* (2019.01)

(52) U.S. Cl.
CPC ........ *G06F 16/288* (2019.01); *G06F 16/2264* (2019.01)

(58) Field of Classification Search
CPC .......................... G06F 16/288; G06F 16/2264
See application file for complete search history.

(56) References Cited

U.S. PATENT DOCUMENTS

| | | | |
|---|---|---|---|
| 2018/0189361 A1 | 7/2018 | Brainerd et al. | |
| 2019/0188308 A1* | 6/2019 | Simon ................... | G06F 16/219 |
| 2022/0138191 A1* | 5/2022 | Hermanek .............. | G06F 16/21 707/769 |

FOREIGN PATENT DOCUMENTS

EP    3502915    6/2019

OTHER PUBLICATIONS

Extended European Search Report received in European Application No. 24206620.7 dated Mar. 13, 2025, 9 pages.

* cited by examiner

*Primary Examiner* — Aleksandr Kerzhner
*Assistant Examiner* — Aryan D Toughiry
(74) *Attorney, Agent, or Firm* — Klarquist Sparkman, LLP

(57) ABSTRACT

Techniques and solutions are provided for identifying relationships between data objects. In particular, the present disclosure provides techniques that can identify data objects that are related to data objects in a lineage graph, as well as being useable to identify relationships between existing lineage graph data objects. A lineage data object is compared with a candidate data object. For example, attribute types, attribute values, or information regarding such attribute types or values can be compared between the lineage data object and the candidate data object. If it is determined that a relationship criterion is satisfied, a relationship can be established or suggested between the lineage data object and the candidate data object. A display is rendered that displays a lineage graph with the relationship between the lineage data object and the candidate data object. A user can define an edge between the lineage data object and the candidate data object.

20 Claims, 10 Drawing Sheets

500

For each table T1 in the database landscape (across all databases):
    For each column T1_col of that table T1:
        Iterate over each table T2 in the database landscape except T1 and do:
        candidate columns of T2 = Filter columns of table T2
        computed column set for T2 = Compute columns for candidate columns of T2
        For each column T2_col in the computed column set for T2:
            column similarity = Similarity of columns T1_col and T2_col
            If the column similarity is greater than the column similarity threshold:
                report relation between T1 and T2 via T1_col with T2_col

FIG. 5

DATA OBJECT GRAPH ENHANCEMENT FRAMEWORK

FIELD

The present disclosure generally relates to identifying relationships between data objects.

BACKGROUND

Software is increasingly integral to business processes, from manufacturing, including supply chain management, to logistics, to sales, to planning and accounting processes. An immense amount of data can be involved, which can be spread amongst thousands of data objects, each often having hundreds of individual attributes. Data objects often have complex interrelationships, such as where higher-level data objects may incorporate data from one or more lower-level data objects. Further complexity is introduced through the rapid growth of data volume, and because the requirements for a business process can change over time.

Data objects can be spread across different platforms. For example, data can be stored in relational databases or in an unstructured format or semi-structured format, such as "object stores," which can store data in JSON (or, more generally, CSON) format, or data stored in flexible NoSQL databases. Other types of data can include unstructured text or media files, such as images, audio, or video.

As another example, data from transactional systems (such as using OLTP) may be converted and used in analytical (OLAP) scenarios. "ETL" processes and other types of import/export functionality can be used to share data between systems. ETL processes can be complex to design, particularly while ensuring data accuracy and consistency. A computing system may have business processes that involve a flow of data within a given system, as well as between systems.

Data can be stored at various "layers," such as having a relational database layer (physical storage) that is referenced by a virtual data model (such as CDS views or ABAP views of SAP SE of Walldorf, Germany), representing an intermediate level of abstraction, where in turn logical data objects, such as BUSINESSOBJECTS of SAP SE, are used at a higher-level of abstraction. The higher-level data objects can provide easy to work with representations of semantically meaningful documents, such as a logical data object representing a sales order, where the data object can provide access to data associated with a sales order as well as providing operations that can be performed with or on a sales order.

Understanding the relationships between data can be a daunting task. Relationships between data may have been created for a particular purpose, but the lack of a holistic understanding of the data can lead to process inefficiencies. This lack of understanding can be particularly problematic given that business processes often benefit from continued monitoring and adjustment. In addition, because data relationships are often enforced on the data, there can be latent relationships between the data that could be practically useful if discovered. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for identifying relationships between data objects. In particular, the present disclosure provides techniques that can identify data objects that are related to data objects in a lineage graph, as well as being useable to identify relationships between existing lineage graph data objects. A lineage data object is compared with a candidate data object. For example, attribute types, attribute values, or information regarding such attribute types or values can be compared between the lineage data object and the candidate data object. If it is determined that a relationship criterion is satisfied, a relationship can be established or suggested between the lineage data object and the candidate data object. A display is rendered that displays a lineage graph with the relationship between the lineage data object and the candidate data object. A user can define an edge between the lineage data object and the candidate data object.

In one aspect, the present disclosure provides a process of identifying an at least putative relationship between a lineage data object and a candidate data object. A definition of a lineage graph of a plurality of lineage data objects is received. The definition includes identifiers of lineage data objects of the plurality of lineage data objects, forming nodes of the lineage graph, and identifiers of relationships between the plurality of lineage data objects, forming edges of the lineage graph, wherein lineage data objects include one or more attributes.

Metadata is received for a plurality of candidate data objects. The metadata includes candidate data object identifiers and identifiers of attributes defined for respective candidate data objects. A lineage data object and a candidate data object are selected. The lineage data object is compared with the candidate data object.

It is determined that the lineage data object and the candidate data object satisfy a relationship criterion. At least a putative relationship between the candidate data object and the lineage data object is established. An updated lineage graph that comprises the at least a putative relationship is rendered for display.

The present disclosure also includes computing systems and tangible, non-transitory computer-readable storage media configured to carry out, or includes instructions for carrying out an above-described method. As described herein, a variety of other features and advantages can be incorporated into the technologies as desired.

BRIEF DESCRIPTION OF THE DRAWINGS

FIG. 5 provides example pseudocode of a process of comparing tables in a lineage graph to tables corresponding to candidate data objects.

DETAILED DESCRIPTION

Example 1—Overview

Figure 1:
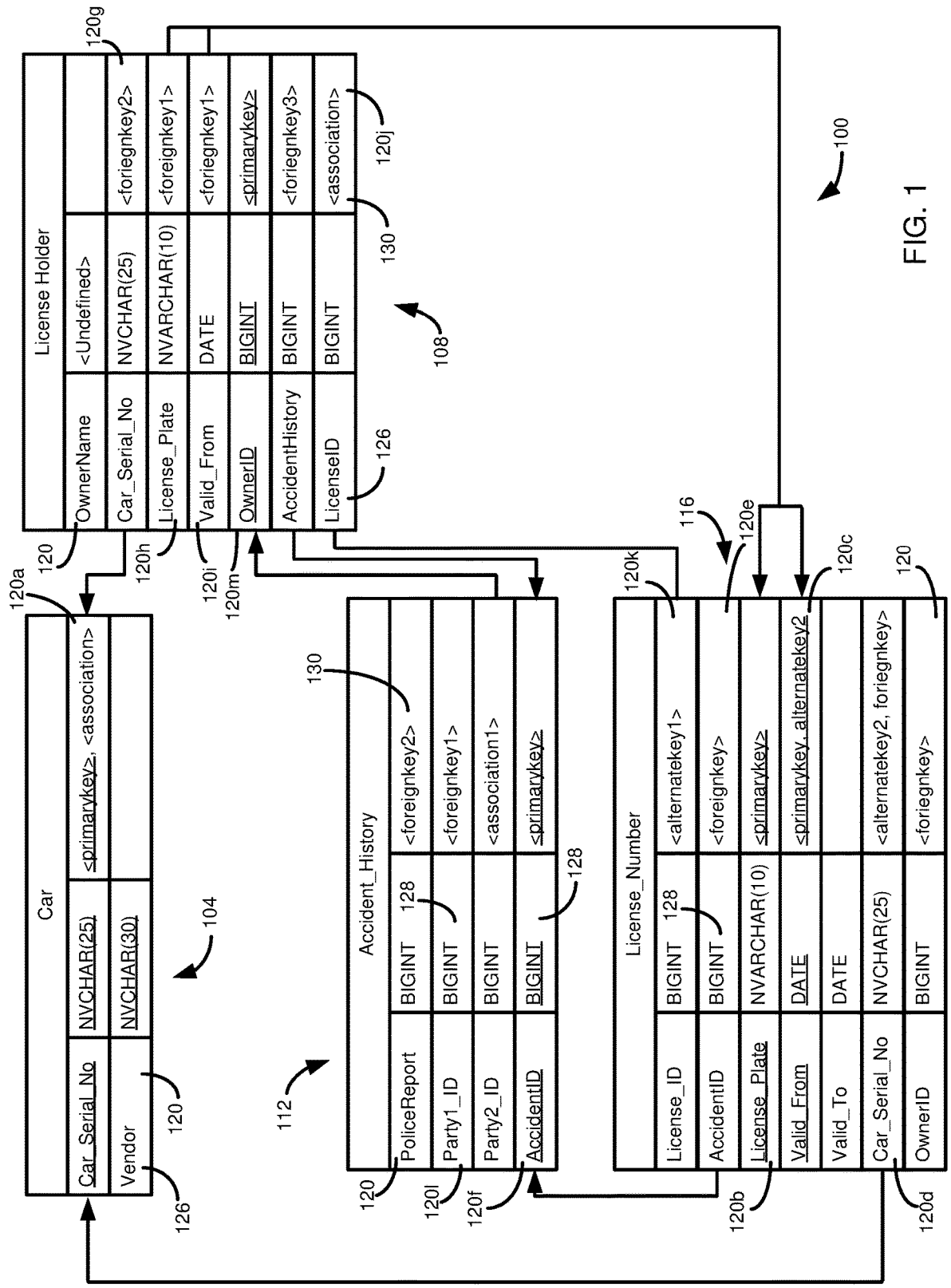
FIG. 1 is a diagram of a database schema showing technical relationships between at least a portion of database tables in the schema.

Software is increasingly integral to business processes, from manufacturing, including supply chain management, to logistics, to sales, to planning and accounting processes. An immense amount of data can be involved, which can be spread amongst thousands of data objects, each often having hundreds of individual attributes. Data objects often have complex interrelationships, such as where higher-level data objects may incorporate data from one or more lower-level data objects. Further complexity is introduced through the rapid growth of data volume, and because the requirements for a business can change over time.

Data objects can be spread across different platforms. For example, data can be stored in relational databases or in an unstructured format or semi-structured format, such as "object stores," which can store data in JSON (or, more generally, CSON) format, or data stored in flexible NoSQL databases. Other types of data can include unstructured text or media files, such as images, audio, or video.

As another example, data from transactional systems (such as using OLTP) may be converted and used in analytical (OLAP) scenarios. "ETL" processes and other types of import/export functionality can be used to share data between systems. ETL processes can be complex to design, particularly while ensuring data accuracy and consistency. A computing system may have business processes that involve a flow of data within a given system, as well as between systems.

Data can be stored at various "layers," such as having a relational database layer (physical storage) that is referenced by a virtual data model (such as CDS views or ABAP views of SAP SE of Walldorf, Germany), representing an intermediate level of abstraction, where in turn logical data objects, such as BUSINESSOBJECTS of SAP SE, are used at a higher-level of abstraction. The higher-level data objects can provide easy to work with representations of semantically meaningful documents, such as a logical data object representing a sales order, where the data object can provide access to data associated with a sales order as well as providing operations that can be performed with or on a sales order.

Understanding the relationships between data can be a daunting task. Relationships between data may have been created for a particular purpose, but the lack of a holistic understanding of the data can lead to process inefficiencies. This lack of understanding can be particularly problematic given that business processes often benefit from continued monitoring and adjustment. In addition, because data relationships are often enforced on the data, there can be latent relationships between the data that could be practically useful if discovered. Accordingly, room for improvement exists.

The present disclosure provides techniques and solutions that can be used to discover relationships between data, stored in data objects. As used herein, a data object refers to a collection of related attribute values that is stored as a set. The set can be an "object" in the sense of being an instance of an abstract or composite datatype. However, "objects" also refer to sets of data that may not have a rigidly enforced structure. For example, "data objects" includes information stored in JSON objects or in XML documents.

Relationships between data, and their associated data objects, can be used, in some scenarios, to improve data processing, such as reducing a volume of processed data or reducing a number of processing steps. In addition, these relationships can suggest new insights that can be obtained using already existing data.

A data model, or schema, of particular data or a set of data is often present. As described, this can be part of a formal "definition," or can be provided in computing code in the sense of code that provides JSON objects or XML documents in a defined manner. Thus, "data model" or "schema" can refer to an organization of an object in code that is not part of a distinct object definition in the sense of an abstract or composite data type. A data model may be used for a single abstraction layer (which can include physical storage), or for a single data source, such as particular database system. A data model may be defined with respect to multiple data sources or abstraction layers.

A data model includes data objects, such as tables or views of a relational database or entities or views of a virtual data model. As discussed, data typically "flows" between data objects based on relationships between the data objects. For example, a view may be defined as a projection of a particular data object, or as a combination of data from multiple data objects, such as a join operation in a relational database. For a particular data model, some data objects can be related to each other, while other data objects can be unrelated. Even when data objects are related, they can have a direct relationship or an indirect relationship. For example, a view may build on a lower-level view, that is in turn defined with respect to one or more tables.

Relationships between data objects can be of various types. For example, views can be defined with respect to selection conditions, including join operations, where the selection or joins involve particular attributes. Foreign key relationships can be used for a variety of purposes, including facilitating joins, but also for purposes of enforcing referential integrity, enabling cascaded operations, improving query performance (where the relationship provides hints to a query optimizer regarding related objects), to ease understanding of a schema, or to enforce data rules, such as those associated with a computing process (such as one implementing a business process), or for controlling access to data.

A data model encompasses data objects like tables or views of a relational database or entities and views within a virtual data model (VDM). Within the realm of VDM, associations serve as predefined links between entities or views, encapsulating business logic and common access paths, while calculated fields derived from attributes of VDM entities can also create implicit linkages. Direct mappings define how data in the physical database layer is fetched and presented in the VDM. Furthermore, annotations, as an overlay of metadata, provide insights into how a VDM entity or view correlates with database objects.

The transition between the VDM and business objects is often facilitated through service exposures, where entities in the VDM might be exposed as consumable services for business objects. Business semantics, drawn from annotations or metadata within the VDM, offer interpretations that business objects can then utilize to process data.

As for ETL processes and inter-system data flows, transformation logic during ETL operations dictates how data from source tables is reshaped, aggregated, or enriched, thereby establishing links between the source and transformed data. Keys and indexes introduced post-extraction align with source systems, retaining a relationship with the transformed data. ETL operations often use audit logs that trace data lineage, forming connections between the original data and its final location post-load.

Outside of ETL, data replication tools that duplicate data from one system to another inherently form a link between the source and target, often upheld via replication logs or timestamps. When systems engage in data exchanges through APIs, the ensuing request-response dynamics, supported by unique identifiers such as transaction IDs, create explicit links between data objects across these systems. Messaging protocols, where systems might offload data to topics or queues for other systems to retrieve, exhibit a publisher-consumer relationship, establishing a link between data objects. In certain database scenarios, objects in one system might be related to objects in a completely different system using foreign key references.

In data modeling, schema mappings act as guides for the translation and alignment between source and target schemas. Laid out in transformation rules or conversion functions, these mappings connect different data models. Within relational databases, they determine how tables, columns, and relationships in a source schema relate to those in a target schema. For example, a column in one database with a specific datatype and constraints might correspond to another column in a different system, with adjustments in its definition or constraints, all managed by these mapping rules.

Not just limited to tables and columns, schema mappings also provide logic for transformations for stored procedures, views, and triggers. An entity in one schema might undergo transformations, as per these mappings, to appear as a view in another schema, maybe combined or adjusted based on business requirements.

In more involved scenarios like object-relational mapping (ORM), schema mappings serve as the intermediary between object-oriented application code and relational databases. In this context, class definitions and object structures in an application are mapped to tables, rows, and columns in a database. Such mappings influence how data is stored, retrieved, and aspects like data integrity and relationship enforcement.

When dealing with data lakes or non-relational storage systems, schema mappings help transform structured datasets into flat files or the opposite, and create connections between hierarchical data formats, such as JSON or XML, and tabular database structures. Schema mappings can be used in data migration and integration projects, especially when connecting varied data models. Their detailed design, which includes conditional logic, data type conversions, and exception handling, help provide data consistency and accuracy across different systems.

In one aspect, the present disclosure uses a set of relationships as a starting point to identify new relationships between objects in the set of relationships, as well as between other objects that are not connected via a relationship. While various types of relationship representations can be used with techniques of the present disclosure, a particular scenario is described with respect to lineage graphs.

In the realm of data management, lineage graphs serve as visualization tools, illustrating the trajectory and transformation of data as it flows through different systems and processes. A lineage graph visually traces data from its origin or source to its final destination or target, highlighting transformative steps in between. As used herein, a lineage graph is defined as a collection of data objects from a plurality of different software abstraction layers or a plurality of data sources, wherein at least a portion of edges between data objects in the lineage graph connect data objects from different software layers or data sources and where at least a portion of the edges indicate particular data transformations that are performed when data flows over an edge.

In some cases, data sources can be "remote" or otherwise operationally separated from one another. As a particular example, one data source may be able to obtain data from other data sources using data federation. Thus, an edge represents a relationship between data objects, but can also represent a "barrier" between different data sources, including "physical barriers," where the data sources might be connected over a network.

Within a lineage graph, nodes typically represent various data objects. These could range from tables in relational databases to entities in virtual data models, or even more abstract constructs like business objects. The edges connecting these nodes, on the other hand, depict the relationships or operations that act upon the data, illustrating its path of flow and transformation.

Take, for instance, a scenario involving a relational database. The lineage graph might depict tables as primary nodes. Edges between these nodes can indicate operations, such as SQL join conditions or foreign key constraints. When a view, which aggregates or reshapes data from multiple tables, is introduced, it might also appear as a node, connected to its constituent tables with edges indicating the nature of the data transformation or selection.

In lineage graphs, edges serve as a representation of the flow and transformation of data between distinct data objects. Every edge possesses an origin, which is its starting point, and a destination, marking its endpoint. This establishes the connection between specific data objects. Additionally, edges often carry transformation metadata that elucidates the nature of data manipulation. This includes the type of transformation—be it aggregation, filter, join, or calculation—and detailed specifics, such as data being "aggregated using SUM" or "filtered where age >30".

Some edges may also include temporal information, such as indicating an exact time of data movement or transformation, and how often such operations occur. Edges can have an associated confidence or quality score, especially in automated lineage graphs. This score provides insights into the system's certainty regarding a particular transformation.

Another attribute that can be included as edge information is data volume, indicating the quantity of data that has been transferred from the source to the target. Operational metadata attached to an edge can also indicate the tools or systems leveraged for the transformation, like a specific ETL tool or database, and pinpoint the party responsible for the data flow. Edges may also indicate documentation or annotations for added context and clarity about a relationship or transformation.

The visual depiction of an edge, its type or style, can also be included as edge information, and can vary based on its significance. For instance, while solid lines might represent direct data flows, dashed lines could denote less frequent or periodic flows.

As a more specific example, the following code represents an example Python edge class for a lineage graph:

```
class LineageEdge:
    def __init__(self, origin, destination, transformation_type, transformation_details):
        self.origin = origin
        self.destination = destination
        self.transformation_type = transformation_type
        self.transformation_details = transformation_details
    def __str__(self):
        return f"From {self.origin} to {self.destination} via {self.transformation_type}: {self.transformation_details}"
# Example usage:
edge1 = LineageEdge(
    origin="TableA",
    destination="ViewX",
    transformation_type="join",
    transformation_details="joined on column_ID"
)
edge2 = LineageEdge(
    origin="ViewX",
    destination="FinalView",
    transformation_type="filter",
    transformation_details="filtered where value > 10"
)
print(edge1) # Outputs: From TableA to ViewX via join: joined on column_ID
print(edge2) # Outputs: From ViewX to FinalView via filter: filtered where value >
    10
```

When also considering virtual data models, the lineage graph can grow in complexity. Nodes representing entities in a VDM might be linked to those in the underlying relational database. These links, or edges, can indicate mappings or transformation logic that channels data from physical storage to a more abstract, logical layer.

Incorporating BusinessObjects into the lineage graph, these high-level logical constructs might appear as distinct nodes, linked to VDM entities or even directly to database tables. The connecting edges can signify not just data flow, but also the operational interactions-such as how a sales order BusinessObject might retrieve, modify, or store data in associated tables or entities.

Further complexities can arise with the introduction of ETL processes, which can be depicted as transformative nodes or edges on the lineage graph. Data flowing from one system, passing through an ETL process, and being received by another can be visually represented, capturing transformations, filtering, or aggregations applied during the data migration.

Schema mappings, especially in scenarios involving data integration or migration, can also be represented in lineage graphs as well. These mappings, which define the correlation between source and target schemas, can be illustrated as dedicated connectors or annotated edges, helping users understand how data attributes in one system align with those in another.

Information regarding another collection of data objects, referred to as candidate objects in a candidate set, can be obtained, such as objects in schemas and data sources that are sources of the objects and relationships, or from schemas and data objects that are not currently used in the lineage graph. Information about the candidate set of candidate data objects can include relationships between candidate data objects in the candidate collection, candidate object types, candidate object metadata, and candidate object data. For example, attributes and attribute datatypes can be identified for particular candidate data objects. Data values associated with an instance of the candidate data object can be retrieved.

Data objects of the lineage graph, referred to as lineage data objects, can be compared with candidate data objects. For example, a name of an attribute in a lineage data object can be compared with a name of an attribute in a candidate data object. Individual values associated with a lineage data object can be compared with individual values in a candidate data object. Information about a collection of values, such as values for a particular attribute, in a lineage data object can be compared with corresponding information for a candidate data object. More generally, comparisons can be made between source and target objects, where both compared objects can be lineage data objects or can be candidate data objects.

In addition to comparing unitary aspects of a lineage data object to aspects of candidate objects, multiple aspects can be compared. In one example, values for two attributes in one data object can be combined, such as mathematically or by concatenation, and compared with values for a single attribute in the other data object being compared. Similarly, scores for multiple attributes or other aspects of data objects can be compared. Collections of data objects can also be used for comparison purposes. For example, if two candidate data objects are identified as being related to two lineage data objects, and the candidate data objects are related in a corresponding way as a relationship between the two lineage data objects, that can be more indicative of a correspondence between the lineage data objects and the candidate data objects.

If a lineage data object is determined to be sufficiently related to a candidate data object, a link can be established or proposed between the objects. For example, if a column of a lineage data object is sufficiently related to a column of a candidate data object, a foreign key relationship can be defined (or suggested) between the columns, or a join can be defined (or proposed) between the two data objects using matching columns as a join condition. In the case of a join operation, defining a join between data objects can include modifying an existing join of a lineage graph, such as switching a join between two lineage data objects to be a join between one of the lineage data objects and a candidate data object, or with a different lineage data object than used in the original join. In general, a type of relationship described above between data objects, whether of the same or different types, or at the same or different system, can be established or proposed using disclosed techniques.

In some aspects, once a possible relationship is identified between a candidate data object and a lineage data object, the possible relationship can be visually displayed to a user. A user can then choose whether to make changes to the lineage graph. For example, the user can formalize the relationship by including details regarding transformations, combinations, filtering, or aggregations between the lineage data object and the candidate data object being added as a new lineage data object for the lineage graph.

In some scenarios, establishing a relationship between a lineage data object and a candidate data object can improve computing efficiency. In one example, a newly identified relationship can result in smaller amounts of data being transferred or processed, or fewer data objects being used for a particular data flow. For instance, a possible relationship been a first lineage data object and a second lineage data object or a candidate data object can be used remove or modify a relationship between the first lineage data object and a third lineage data object. In particular, an identified possible relationship can provide the basis for a join between the first lineage data object and a data object that is at a "higher level" in a hierarchy than the second lineage data object, which can be more efficient than the original join with the second data object. A In another example, data can be available from multiple sources, and a newly identified relationship can allow data to be obtained more efficiently, such as by obtaining data locally rather than from a remote system, or by obtaining data in a manner that does not require, or requires less, data conversion.

Although disclosed techniques have been described as being applied between lineage data objects and candidate data objects, they can also be used to identify new relationships between lineage data objects, between candidate data objects, or between a set of lineage data objects and candidate data objects already having an identified relationship with the lineage data objects.

Example 2—Example Relationships Between Data Objects

Database systems typically include an information repository that stores information regarding a database schema, which is a particular example of object metadata that can be used in disclosed techniques. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, as described above, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primarily intended for human use. Data dictionaries can also contain or express relations between data dictionary objects through various properties (which can be reflected in metadata), such as having the data dictionary reflect that dictionary objects are assigned to packages, and thus having a relationship to one another through a package assignment. The information in a data dictionary can correspond to metadata that can be retrieved from a source system by a target system according to the techniques previously described in this disclosure.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

FIG. 1 is an example entity-relation (ER) type diagram illustrating a data schema 100, or metadata model, related to a driver's accident history. The schema 100 (which can be part of a larger schema, the other components not being shown in FIG. 1) can include a table 108 associated with a license holder (e.g., an individual having a driver's license), a table 112 associated with a license, a table 116 representing an accident history, and a table 104 representing cars (or other vehicles).

Each of the tables 104, 108, 112, 116 has a plurality of attributes 120 (although, a table may only have one attribute in some circumstances). For a particular table 104, 108, 112, 116, one or more of the attributes 120 can serve as a primary key-uniquely identifying particular records in the tuple and being designated as the main method of accessing tuples in the table. For example, in the table 104, the Car_Serial_No attribute 120a serves as the primary key. In the table 116, the combination of attributes 120b and 120c together serve as the primary key.

A table can reference records associated with the primary key of another table through the use of a foreign key. For example, the license number table 116 has an attribute 120d for a Car_Serial_No in table 116 that is a foreign key and is associated with the corresponding attribute 120a of table 104. The use of a foreign key can serve various purposes. The foreign key can link particular tuples in different tables. For example, a foreign key value of 8888 for the attribute 120d would be associated with a particular tuple in table 104 having that value for attribute 120a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 116, for instance, has an alternate key that is formed from attribute 120c and attribute 120d. Thus, a unique tuple can be accessed in the table 116 using either the primary key (e.g., being a foreign key in another table) or through an association to the alternate key.

Schema information is typically maintained in a database layer, such as a software layer where table values are maintained (e.g., in a RDBMS), and typically includes identifiers for the tables 104, 108, 112, 116, and the name 126 and datatype 128 of their associated attributes 120. Schema information may also include at least some of the information conveyable using the flag 130, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 3—Example Computing Environment with Graph Enhancement Framework

Figure 2:
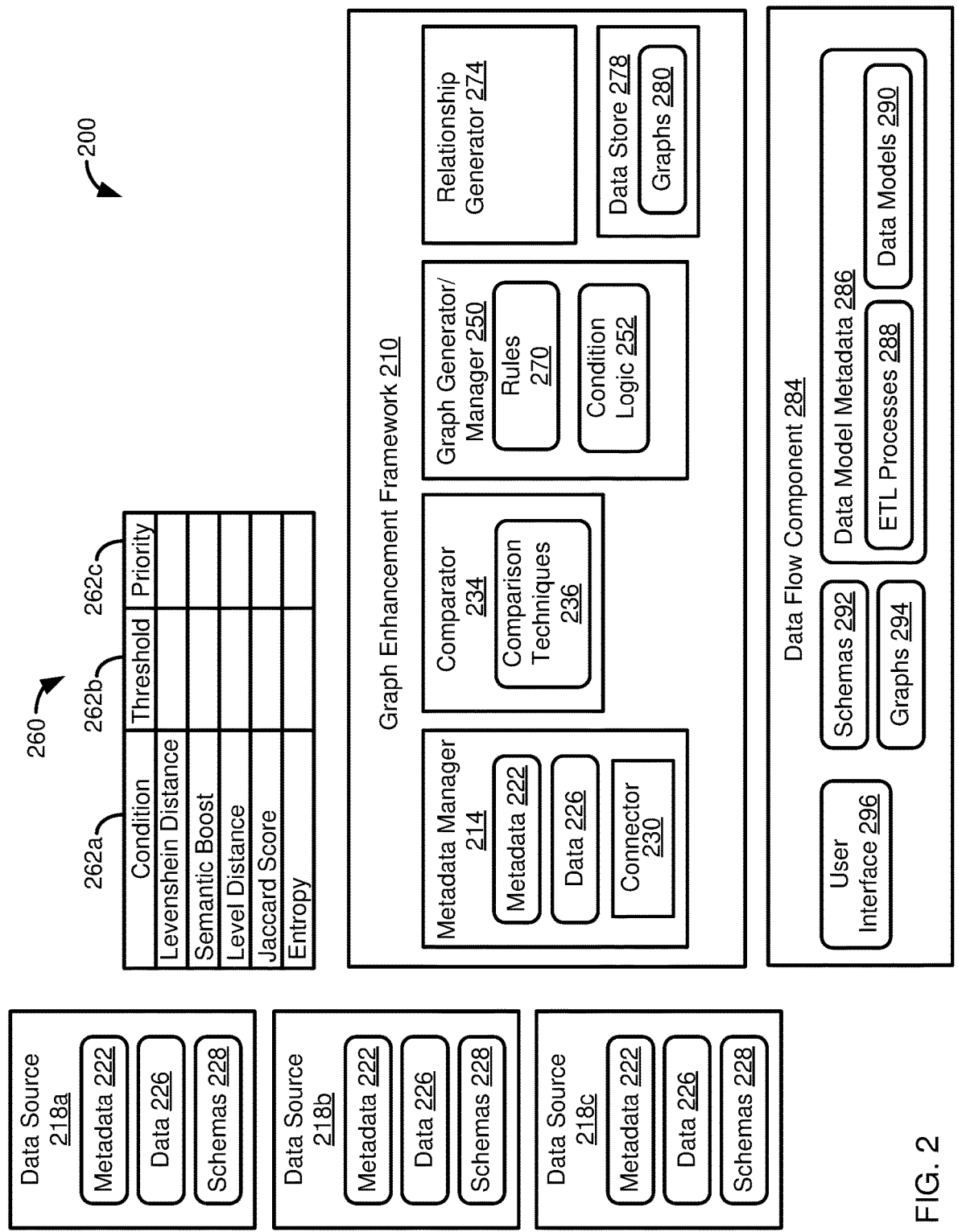
FIG. 2 is a diagram of a computing environment in which disclosed techniques can be implemented, where a graph enhancement framework can be used to identify relationships between objects in a lineage graph and candidate data objects, as well as relationships between objects in the lineage graph or candidate data objects.

FIG. 2 illustrates an example computing environment 200 in which disclosed techniques can be implemented. The computing environment 200 includes a graph enhancement framework 210. While disclosed techniques can be implemented using graph data structures, the disclosed techniques can be implemented in a variety of ways provided that a set of data objects (nodes) are available, and relationships (edges) are defined between data objects. While this Example 3 describes the specific example of a graph enhancement framework 210 that is used for enhancing lineage graphs, the described techniques can be applied to data objects that are not technically part of a lineage graph, including where data objects are related by less than all of the relationship types that might typically be associated with a lineage graph, including being located within a common computing system rather than representing relationships between data objects in different computing systems.

The graph enhancement framework 210 includes a metadata manager 214. The metadata manager 214 retrieves information from various data sources 218 (shown as data sources 218a-218c). The information can include metadata 222 and data 226. The metadata 222 can be stored in, or associated with, schemas 228, such as a data dictionary, information schema, or other type of metadata data catalog.

In some cases, comparisons between lineage data objects and candidate data objects can be made using information that describes a data object, such as, for a table, an identifier for the table and names and datatypes of data columns. Other types of metadata can include semantic information, such as more detailed names or descriptions for the table or table columns, or information about data in the table, such as a number of records in the table (table cardinality) or the number of unique values of a particular column (attribute cardinality).

Information about columns can also include variance and entropy. Variance, a statistical measure, quantifies the dispersion of data points in relation to their mean value. Mathematically, variance for a dataset X with n observations is given by:

$$\sigma^2 = \frac{1}{n}\sum_{i=1}^{n}(x_i - \bar{x})^2$$

Here, $x_i$ represents each individual data point in the set, and $\bar{x}$ is the mean value of all observations. In the context of a relational database, or similar data, the variance within a column, say one containing sales figures, describes the consistency or spread of those figures. A high variance indicates a wide dispersion, implying that the sales figures vary significantly from the mean. Conversely, a low variance denotes that most of the values hover close to the average, suggesting uniformity in sales values.

Entropy, such as used in information theory, gauges the level of unpredictability or randomness associated with data. For a discrete random variable X with possible values $x_1$, $x_2$, ..., $x_p$ and their respective probabilities, entropy can be defined as:

$$H(X) = -\sum_{i=1}^{n} p(x_i) \log_2 p(x_i)$$

When applied to a database column, entropy measures the degree of diversity or uniqueness among its values. A column with distinct values, such as unique transaction IDs, would have an entropy approaching its maximum possible value, indicating high unpredictability. On the other hand, a column with repeated values would exhibit lower entropy. For example, a column capturing a predefined set of categories, such as order statuses ("shipped", "pending", "canceled"), might display lower entropy due to its limited set of possible values.

The data 226 can include data values for a particular lineage data object or candidate data object. In some scenarios, comparison of actual data values between two data objects can be used to determine their degree of similarity.

The metadata manager 214 can include one or more connectors 230. A connector 230 can be used to retrieve data from one or more data sources 218. In the case of a local data source 218, a connector 230 can include query functionality to retrieve metadata 222, data 226, or schemas 228. Data on remote data sources 218 can be accessed using techniques such as data federation or REST or other types of APIs.

The graph enhancement framework 210 further includes comparator 234. The comparator 234 can include one or more comparison techniques 236. In general, a comparison technique can be used to compare metadata or data between two data objects. In a particular example that will be further described, data columns or similar data organizations (such as key values for a particular key in data stored in a JSON representation) can be compared. The comparison can be performed on an element-by-element basis, or information for overall columns can be compared.

As described, comparisons can be made using information such as column (or key) names, data object names or identifiers, datatypes, object types, or by comparing individual data values between columns. Information can also include data object or data attribute cardinality, or statistics for a data object or column, such as minimum or maximum values. However, a variety of other metrics can be used.

In data analysis, the Jaccard distance is a useful metric for assessing similarity between datasets. It is derived from the Jaccard coefficient, which quantifies the overlap between two sets. Given two sets A and B, the Jaccard coefficient, represented as J(A, B), is calculated as:

$$J(A, B) = \frac{|A \cup B|}{|A \cup B|}$$

Here, $|A \cap B|$ denotes the intersection of the sets, and $|A \cup B|$ their union.

Building on this coefficient, the Jaccard distance, which captures the dissimilarity between two sets, is:

$$D(A, B) = 1 - J(A, B)$$

In the context of relational databases, the Jaccard distance has two primary applications: comparing individual values and comparing summary values. If each value in a column is considered a set (of characters or tokens), the Jaccard distance can gauge similarities between values in two columns. For instance, when comparing the strings "apple" and "appetite", one can use the Jaccard formula to measure their similarity. This can be useful when dealing with textual data that might have minor variations or alternate representations.

For a broader column comparison, one can create summary sets, capturing unique values or attributes. Using the Jaccard distance on these sets provides a measure of the overall content similarity between columns. As an example, for columns storing product categories, one can group unique categories from each column into sets. Calculating the Jaccard distance between these sets then gives an idea of how similar the product categorizations are between the columns.

Another measure that can be used to compare values between lineage data objects and candidate data objects is the Euclidean distance. Originating from the Pythagorean theorem, the Euclidean distance gives a direct measure of the "straight-line" distance between two points in Euclidean space.

Mathematically, for two points P ($x_1$, $y_1$) and Q ($x_2$, $y_2$) in a 2-dimensional space, the Euclidean distance d is given by:

$$d(P, Q) = \sqrt{(x_2 - x_1)^2 + (y_2 - y_1)^2}$$

This formula can be extended to higher dimensions. For two points P and Q in an n-dimensional space with coordinates ($x_1$, $x_2$, ..., $x_n$) and ($y_1$, $y_2$, ..., $y_n$) respectively, the distance is:

$$d(P, Q) = \sqrt{\sum_{i=1}^{n}(y_i - x_i)^2}$$

If each row in a column represents a point in a multidimensional space (for instance, features of a product or attributes of a customer), the Euclidean distance can measure the dissimilarity between individual rows across the columns. To assess the overall difference between two columns, aggregate metrics (like means or centroids) can be computed for each column and then the Euclidean distance determined between these aggregate points.

Cosine similarity can also be used in data comparisons. Mathematically, given two vectors AA and BB, their cosine similarity is computed as the dot product of the vectors divided by the product of their magnitudes:

$$\text{Cosine Similarity } (A, B) = \frac{A \cdot B}{\|A\| \times \|B\|}$$

Where A·B represents the dot product of vectors A and B, and ∥A∥ and ∥B∥ denote their respective magnitudes.

When interpreting individual values, particularly textual data represented in vector form, cosine similarity can assess the closeness of these values. Consider two text strings within columns, such as "database" and "data". By converting these strings into vector representations (often using techniques like TF-IDF or word embeddings), the cosine similarity between the vectors can illustrate their semantic proximity. This becomes particularly helpful in identifying near-matches or when the text data carries nuanced distinctions.

For broader level comparison, aggregate vector representations can be extracted. This can be a centroid of vectors of individual entries or another form of aggregation. Computing the cosine similarity between these aggregate vectors can help indicate an overall similarity in content or context between columns. For instance, in columns including document topics, generating a centroid vector for each column's content and measuring the cosine similarity between these vectors can provide insights into how congruent the topics of the two columns are.

Another data comparison technique uses the Levenshtein distance. Also known as the "edit distance," it quantifies the dissimilarity between two strings by calculating the minimum number of single-character edits (insertions, deletions, or substitutions) needed to transform one string into the other.

Conceptually, the Levenshtein distance operates by constructing a matrix where one string is placed along the top row, and the other along the side column. Each cell of this matrix represents a partial edit distance between substrings. The process starts with an initial setup where each cell's value depends on its neighboring cells, representing the number of operations taken to match the two substrings so far. By progressing through this matrix, one eventually arrives at the bottom-right cell, which provides the total edit distance between the two full strings.

The Levenshtein distance can be used to compare individual strings across two columns. For example, in columns storing names, the Levenshtein distance can pinpoint and quantify minor variations, typos, or inconsistencies, between the names in the columns. In disclosed techniques, the Levenshtein distance can be used to determine whether two columns include the same values or similar values. If values of one column consistently differ by a single edit from values in another column, that might indicate that the values of the column are equivalent, but where one column simply includes an additional character that may not affect the semantic meaning of the data.

Aggregations of Levenshtein distances can also be useful. For instance, calculating the average Levenshtein distance between all string pairs from two columns provides a measure of overall textual similarity or difference between them.

Some types of data, such as unstructured text or media files (image, video, or audio), may benefit from other types of comparison techniques. In particular, it can be useful to submit values to an autoencoder, and then compare the encoded values.

An autoencoder is a neural network designed for unsupervised learning. Its architecture comprises two main components: the encoder and the decoder. The encoder compresses input data into a lower-dimensional representation known as the latent space or encoding, typically with lower dimensionality than the original data. The decoder reconstructs the input data from the encoded representation. During training, the autoencoder minimizes the reconstruction error, learning to capture essential features and patterns in the input data.

Unstructured data, including text and images, poses challenges in various machine learning tasks, including data comparison. To make unstructured data suitable for analysis, it is transformed into a fixed-size vector representation. Trained on unstructured data, such as text or images, the autoencoder learns to create a meaningful and concise data representation. After training, the encoder converts unstructured data into a fixed-size vector, capturing essential information.

Trained autoencoders enable the application of traditional vector-based comparison techniques like cosine similarity or Euclidean distance to measure the similarity between documents or text fragments. This vector representation facilitates efficient and scalable comparisons of unstructured data.

Returning to FIG. 2, a graph generator 250 can include condition logic 252. The condition logic 252 can be used to evaluate the different similarity measures described above. For example, the condition logic 252 can specify a Jaccard distance threshold distance that will be used to determine whether two data objects, data object components (such as columns), or data values are sufficiently similar to be considered as related.

In some scenarios, instead of, or in addition to, determining a binary result of similarity, a degree of similarity can be used. The degree of similarity can be a raw metric value, or can be derived from one or more metric values. In a similar manner, a binary determination of similarity can be made using raw values, or can be derived from one or more metric values. Even if two objects are sufficiently similar that an edge is suggested between a lineage data object and a candidate data object, a similarity value can be reported, which can assist a human or computing process in understanding how strong a relationship may be, which can be used, for example, in modifying data flows based on candidate data objects that are identified as related to lineage data objects.

In FIG. 2, table 260 provides an example representation of the condition logic 252. The table 260 includes a column 262*a* that identifies a particular comparison metric, a column 262*b* that identifies a threshold value used to determine whether a comparison metric indicates a relationship, and a column 262*c* that associates a priority with a particular comparison metric. That is, at least in some cases, a given pair of data objects can be evaluated using multiple techniques. The priority information can be used, for example, in weighting different binary outcomes of comparison techniques, where a combined result is then used to make a final determination of whether two data objects are related, or a measure of relationship strength.

Note that the table 260 includes a condition of level distance. Level distance can indicate a degree of indirection between two data objects. For example, considering an existing lineage graph, relationships can be determined between lineage data objects that might not already be reflected in the lineage graph. Relationships can be considered that are more direct than an existing indirect relationship. However, a relationship can be more strongly indicated as lower levels of indirection. Similar evaluations can be considered when a candidate data object is identified as related to a lineage data object, where additional lineage data objects can be considered for a possible relation with the candidate data object.

The graph generator 250 of the graph enhancement framework 210 can be used to generate graphs based on the values generated using the condition logic 252. For example, the graph generator 250 can use rules 270 to determine whether a particular candidate data object should be added to a graph, what objects in the graph it should be connected to, and optionally a weight or other metric value, which can also be referred to as a score, provided to indicate a strength of the relationship.

Optionally, the graph generator 250 can call a relationship generator 274 to determine a type of relationship, or to suggest a particular implementation of the relationship, or to actually implement the relationship. As an example, consider a linage data object that is identified as having a relationship with a candidate data object. Both objects can have multiple attributes, such as columns. Assuming that both objects have multiple columns, it can be that the objects were determined to be related based on one or more of the particular columns, where other columns may not have a corresponding "match" in the other data object. In the case of relational database tables or views, the relationship generator 274 can suggest, or generate, a join based on one or more of the related columns, or can suggest a foreign key relationship.

For example, metadata 222 associated with the data objects can be used to identify primary key columns in the data objects. Such information can also be used in suggesting a relationship in the first place, such as where a join or foreign key relationship is determined to be more likely if one column of a data object forms a primary key for the object.

In the case of a join, or the establishment of another type of relationship, such as a relationship that results in import of data for a candidate data object, all data from the candidate data object, which can now be considered as a lineage data object, can be joined or imported. Or, more sophisticated logic can be used to retrieve a selected portion of such data.

Information for the graph enhancement framework 210, such as the metadata 222, the data 226, the schemas 228, or relationships between data objects established using the graph generator 250 or the relationship generator 274, can be stored in a data store 278. In particular, the data store 278 is shown as including graphs 280, which can correspond to graph definitions-nodes and edges for particular graphs, which can be "initial" graphs or graphs generated during, or at the conclusion of, a disclosed graph enhancement process.

The graph enhancement framework 210 can be in communication with a data flow component 284. The data flow component 284 can store information that is used to generate lineage graphs, as well as lineage graphs generated therefrom. The data flow component 284 can also receive and use updated graphs generated by the graph enhancement framework 210.

The data flow component 284 is shown as including data model metadata 286, where the data model metadata can include information about various types of relationships between data objects, including lineage graph objects. Such information can include definitions of ETL processes 288 or data models 290 that describe data in relevant data sources 218 (where the data models can correspond to a schema 228 of a data source).

The data flow component 284 can include schemas 292 for data sources used in graphs 294, such as lineage graphs. The data flow component 284 can include a user interface 296 that can allow a user to visualize, and interact with (including modifying), the graphs 294.

Example 4—Example Lineage Graph

Figure 3:
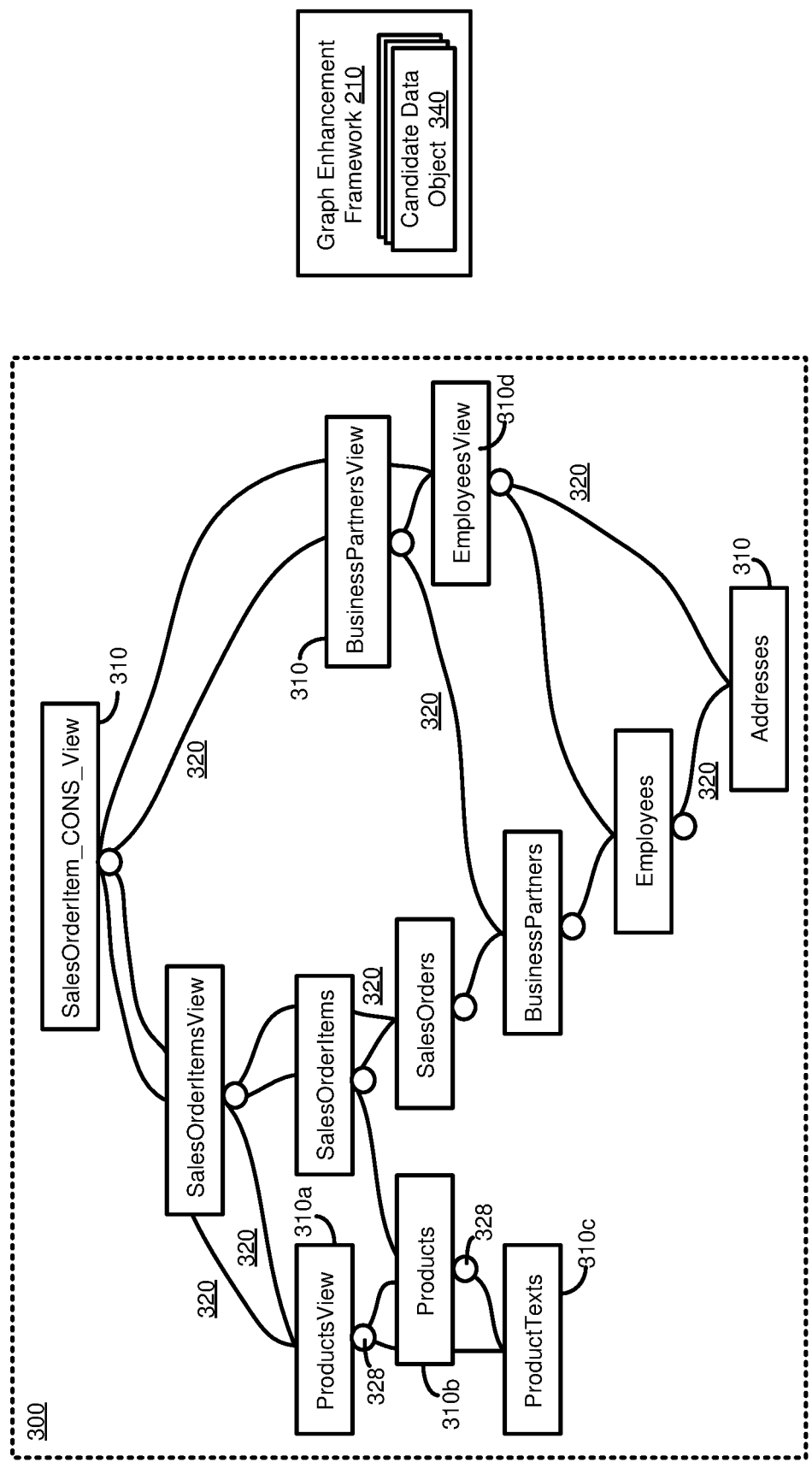
FIG. 3 illustrates an example lineage graph, as well as a graph enhancement framework that includes information for multiple candidate data objects.

FIG. 3 illustrates an example lineage graph 300. The lineage graph 300 includes a plurality of lineage data objects 310. The lineage data objects 310 can be of the same type or can be of different types, and can be associated with the same system or with different systems. Lineage data objects 310 can be of types such as relational database tables or views, entities or views in a virtual data model, data stored in OLAP objects, data stored in logical data objects, such as BUSINESSOBJECTS of SAP SE, of Walldorf, Germany, or data in a semi-structured or unstructured format, including data stored in XML or JSON format.

Typically, a lineage data object 310 includes one or more attributes (not shown), which can be implemented in a similar manner as described with respect to FIG. 1. As described in FIG. 1, and in the discussion of Example 1, lineage data objects can have various relationships with one another, including through use of the attributes.

Lineage data objects 310 can be connected via edges 320. An edge 320 indicates a relationship between two data objects, where typically an edge is directed. As shown in FIG. 3, lineage data objects 310 at the top of the lineage graph can "build" on lineage data objects at lower levels. For example, a lineage data object 310 in the form of a view can be defined with respect to other views or relational database tables.

Relationships between lineage data objects 310 can be specified at various levels of detail. In some cases, an edge 320 can simply represent a relationship, optionally with a direction. In other cases, an edge 320 can include information such as a nature of a relationship (such as a join or foreign key relationship) or specific details about how the relationships are implemented. In the case of a join, the details can include join conditions, including attributes involved in the join. In the case of a foreign key relationship, the details can include the attributes that serve as the primary key and the attributes that serve as the foreign key.

In the lineage graph 300, dependency nodes 328 indicate when a lineage data object 310 has a direct or indirect dependency on one or more other lineage data objects. For example, lineage data object 310a, Products_View, has a direct dependency on data object 310b, Products, as well as an indirect dependency on lineage data object 310c, ProductTexts. In turn, lineage data object 310b also has a direct dependency on lineage data object 310c. While not shown, the dependency nodes 328 are typically associated with a specific relationship type (such as a foreign key relationship or a join), as well as specific attributes used in the relationship type.

As discussed, the lineage graph 300 can be used as a starting point for graph enhancement. That is, the lineage data objects 310 can be evaluated for relationships with candidate data objects 340 provided by the graph enhancement framework 210 of FIG. 2. In addition, the lineage data objects 310 themselves can be evaluated for relationships that are not captured in an existing lineage graph.

Example 5—Example Comprision of Data Object Attributes

Figure 4:
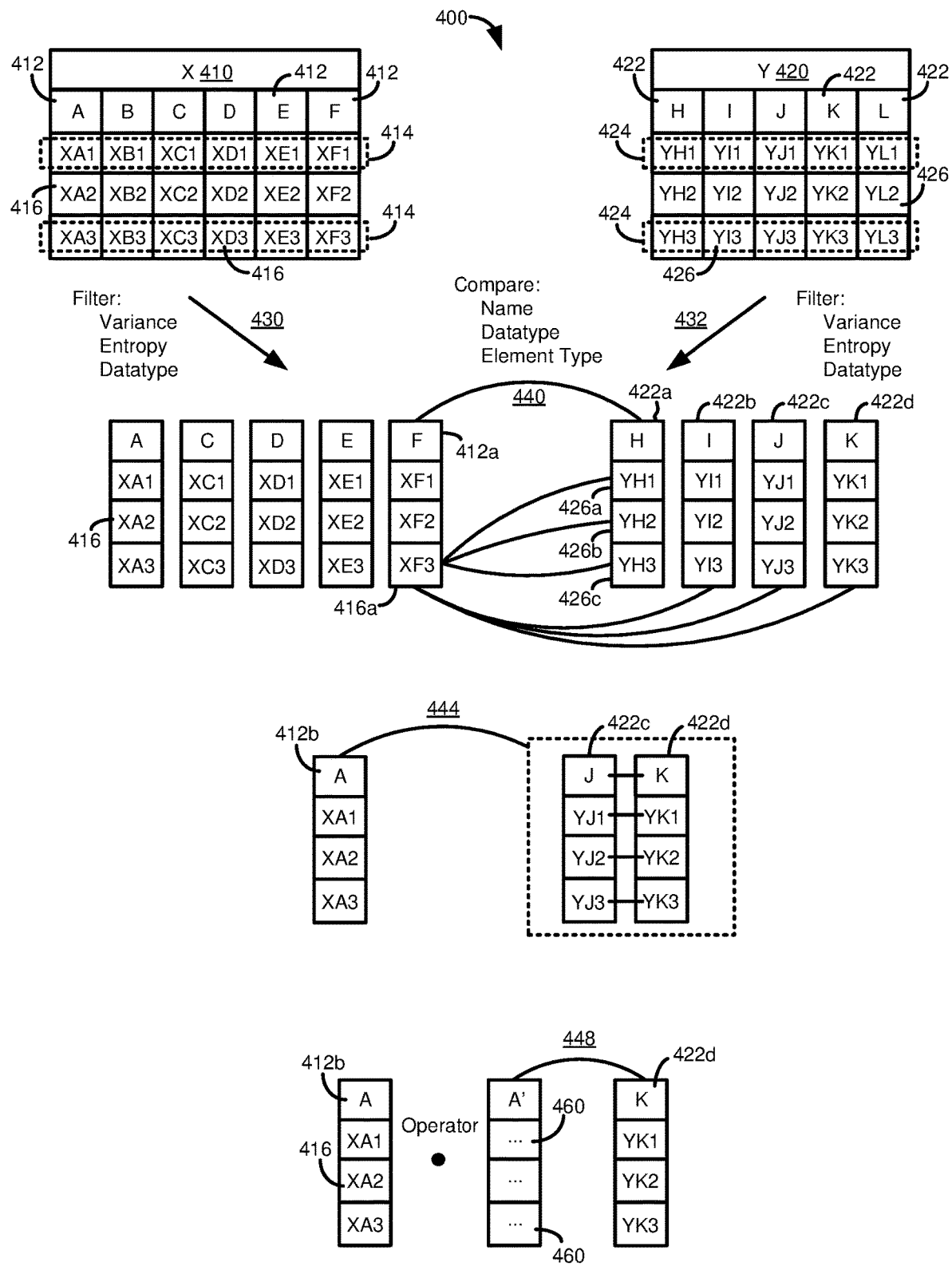
FIG. 4 is a diagram illustrating how attributes of lineage data objects can be compared with attributes of candidate data objects, where the techniques can also be used to compare two lineage data objects or two candidate data objects.

FIG. 4 illustrates a process 400 of comparing lineage data objects with candidate data objects. Although the example is described with respect to tables, the comparison can be performed between other types of data objects, including between data objects of different types. That is, typically a data object can be thought of as a collection of one or more attributes, where typically an attribute has a particular semantic meaning and a particular datatype. In addition, as described earlier, the techniques of this Example 5 can be applied between pairs of data objects, generally, even if one or more data objects being compared are not associated with a lineage graph.

In particular, the process 400 is carried out using a first data object 410 and a second data object 420. The first data object 410 and the second data object 420 have respective attributes 412, 422. Values 416, 426 of attributes 412, 422 are arranged in particular instances 414, 424 of a set of attributes, such as corresponding to a row of a relational database table or a particular instance of a JSON object having a particular schema.

Values 416, 426 of particular instances 414, 424 can be compared, as will be further described. However, the instances 414, 424 can optionally be filtered first. For example, in processes 430, 432, the values 416, 426 of a particular data object instance 410, 420 can be filtered using criteria such as variance or entropy, as those terms are defined in Example 3. That is, not all attributes provide the same value or meaningfulness in such comparisons. Attributes with very high variance or entropy can indicate a broad spread of values or a high degree of randomness, respectively. Such attributes might obscure meaningful comparisons by overwhelming them with noise. By filtering out attributes based on entropy or variance thresholds, a comparison between data objects, including between sets of values for particular data object attributes, can focus on attributes that are more stable or predictable. This can simplify the comparative analysis and highlight more substantive differences or similarities between the two data sets. Moreover, attributes with exceedingly high variance or entropy might indicate data quality issues, such as missing value imputation or errors in data collection.

Relatedly, when significant internal variability exists within a set of values for instances of a particular attribute, the attribute itself may not have a consistent or clear meaning within its own data set. Consequently, when comparing this attribute to another from a different data set, the comparison can become less meaningful. The inherent variability or randomness within one data set can make it challenging to discern whether differences observed between data sets are due to genuine discrepancies or simply the result of the high variability in the original data.

Optionally, other criteria can be used to filter attributes to be compared. For example, some attributes may be less semantically meaningful in some scenarios. For example, Boolean values may be less meaningful than numerical or string values.

In addition to, or instead of, being used as filter criteria, metrics such as variance and entropy, or information such as attribute data type, can be used when evaluating two sets of attributes for semantic equivalence or a semantic relationship. For example, two sets of attributes that have the same datatype and similar entropy or variance may be more likely to be semantically related than if the attributes had different datatypes or if there was a significant difference in their entropy or variance.

In some cases, summary information such as variance, entropy, datatype, name, cardinality, or other descriptive information, is compared in an operation 440 between an attribute of the data object 410 and one or more attributes, and in some cases, all filtered attributes, of the data object 420. In addition, or alternatively, individual attribute values can be compared. For example, for two attributes being compared, a value for an attribute for the data object 410 can be compared pairwise with all of the values for the attribute of the data object 420. If it is known that values in the attributes of the data objects 410, 420 are sorted in a common manner, or it is otherwise known which attribute values are expected to correspond, a single pair-wise comparison can be made between the attribute values.

FIG. 4 illustrates an attribute 412*a* of the first data object 410 being compared with attributes 422*a*-422*d* of the second data object 420. In this case, information about the attribute 412*a* can be compared with information about the attributes 422*a*-422*d*, such as their name, datatype, entropy, variance, attribute cardinality, or instance (record) cardinality.

FIG. 4 also illustrates a particular set of pair-wise comparisons between a value 416*a* of the attribute 412*a* of the first data object and each value 426*a*-426*c* of the attribute 422 of the second data object 420. Similar comparisons can be made for each value 416*a* of the attribute and the values 426 of the attributes 422*b*-422*d*.

A comparison can include determining whether the two values are the same, or a degree of relatedness, including using the techniques described in Example 3. For example, if attribute values being compared are associated with an attribute having string values, the Levenshtein distance between two particular attributes values can be determined. In the case of numerical data, two attribute values can be tested for equality, or a percent difference between two values can be calculated. In some cases, numerical values differing by less than a threshold amount can be classified as being the same. Similarly, the Euclidian distance between two values can be calculated, and the values can be considered the same if the distance is less than a defined threshold. For unstructured data, the attribute values can be processed using an autoencoder and the encoded vectors produced therefrom compared, including as described for numerical values.

Information calculated using the attribute values 416, 426 can also be used in comparing summary information for attributes 412*a*, 422*a* in the operation 440. For example, the Jaccard distance or cosine similarity can be calculated using the values 416, 426 for attributes 412, 422 being compared. Or, aggregated values of attribute comparisons can be compared. For example, for string data or character arrays, the Levenshtein distance can be calculated between attribute values 416, 426 for a particular pair of attributes 412, 422. An average Levenshtein distance can be calculated for each attribute 412*a*, 422*a*, and those averages compared. Other types of statistical measures can be used in a similar manner, such as by comparing standard deviations for Levenshtein values for two attributes 412*a*, 422*a*.

In some scenarios, an attribute 412 may correspond to multiple attributes 422. For example, a value 416 may correspond to a combination of values 426 for multiple attributes 422. The reverse scenario can also occur, where values 416 for multiple attributes 412 correspond to values 426 for a single attribute 422. Disclosed techniques can analyze data for these types of more complex relationships.

FIG. 4 illustrates particular examples of these types of more complex scenarios, where a comparison 448 compares values 416 for attribute 412*b* to values formed by concatenating values 426 from attributes 422*c*, 422*d*. For attributes having numerical values, FIG. 4 illustrates how modified attribute values 460 can be produced by applying an operator to values 416 of attribute 422*a*. The values 460 can then be compared with values of the second data object 420, such as values 426 of attribute 422*d*, which can be carried out as described above. Similar combinatorial/"scaling" operations can optionally be carried out for summary data for attributes 412*b*, 422*d*, such as scaling average attribute values.

FIG. 5 provides example pseudocode 500 for a process of comparing data objects, in this case database tables, to determine whether a relationship should be established (or reported) between the two tables. In the pseudocode 500, a relationship between the tables is identified as long as at least one column of the second table (which can correspond to a candidate data object) is sufficiently similar to a column of the first table (which can correspond to a lineage data object). However, the technique can be implemented in another manner. For example, a relationship can be identified when multiple columns of the second table match columns of the first table. As described, optionally, columns that are sufficiently similar can be used not just to identify a relationship, but to establish a basis and type of a relationship, such as that a relationship corresponds to a foreign key relationship using particular columns of the first and second tables.

Figure 6:
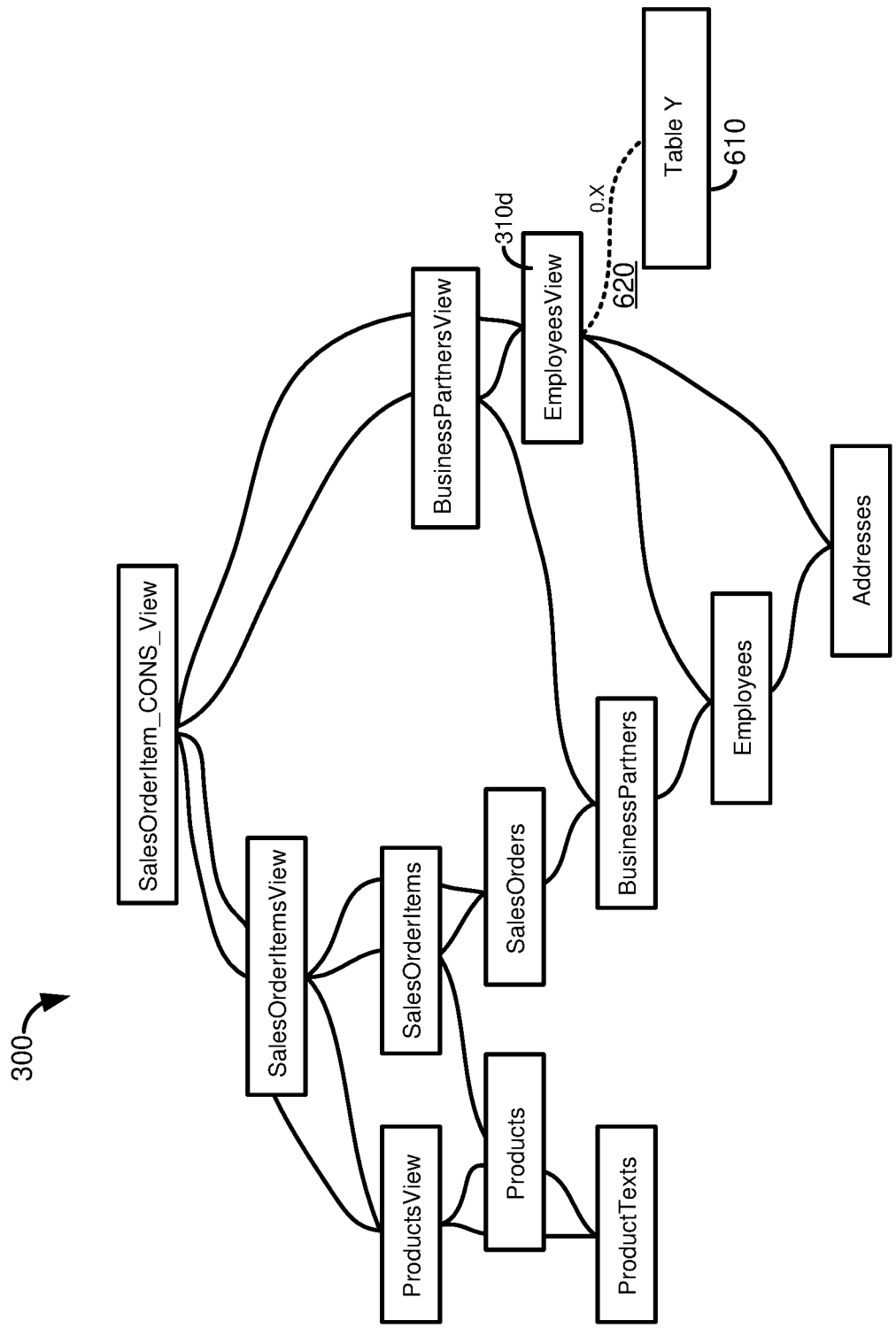
FIG. 6 illustrates a lineage graph including a proposed relationship to a candidate data object, including providing an indicator of a relative strength or confidence for the relationship.

FIG. 6 illustrates the lineage graph 300 with the addition of a table 610 identified as related to lineage data object 310*d* using disclosed techniques. An edge 620 is shown connecting the table 610 and lineage data object 310*d*. The edge 620 is in turn shown with a value indicating a strength of the relationship. The relationship strength can be determined in a variety of ways, such as increasing a strength value if a greater number of attributes are identified as similar between the table 610 and the lineage data object 310*d*, or based on particular similarity values calculated for the table and the lineage data object. For example, the edge 620 can be weighted more heavily or score higher if a greater number of attributes values match between the table 610 and the lineage data object 310*d*, or if a metric, such as a comparison of average values, or a distance, such as the Levenshtein, Jaccard, or Euclidian distance, indicates a stronger relationship (such as by having a shorter distance).

In some cases, the edge 620 can be converted to a "formal" relationship-one that adds the table 610 to the lineage graph 300. Converting the edge 620 can include defining the transformations, combinations, filters, or aggregations associated with the lineage data object 310*d* and the table 610, and can also including assigning a directionality to the edge. For example, the edge 620 can be defined to include values for the example LineageEdge class defined in Example. 1.

In some cases, these operations can be performed automatically using defined rules. As a simple example, a rule can be defined that results in a combination of data from the lineage data object 310*d* and the table 610 (such as via a join operation), where it is assumed that the data in the table 610 should be represented in the data object 310*d*. In other cases, a user can manually determine to convert the edge 620 to a formal relationship, including defining properties associated with connections between lineage graph objects.

Example 6—Example Graph Enhancement Process

Figure 7:
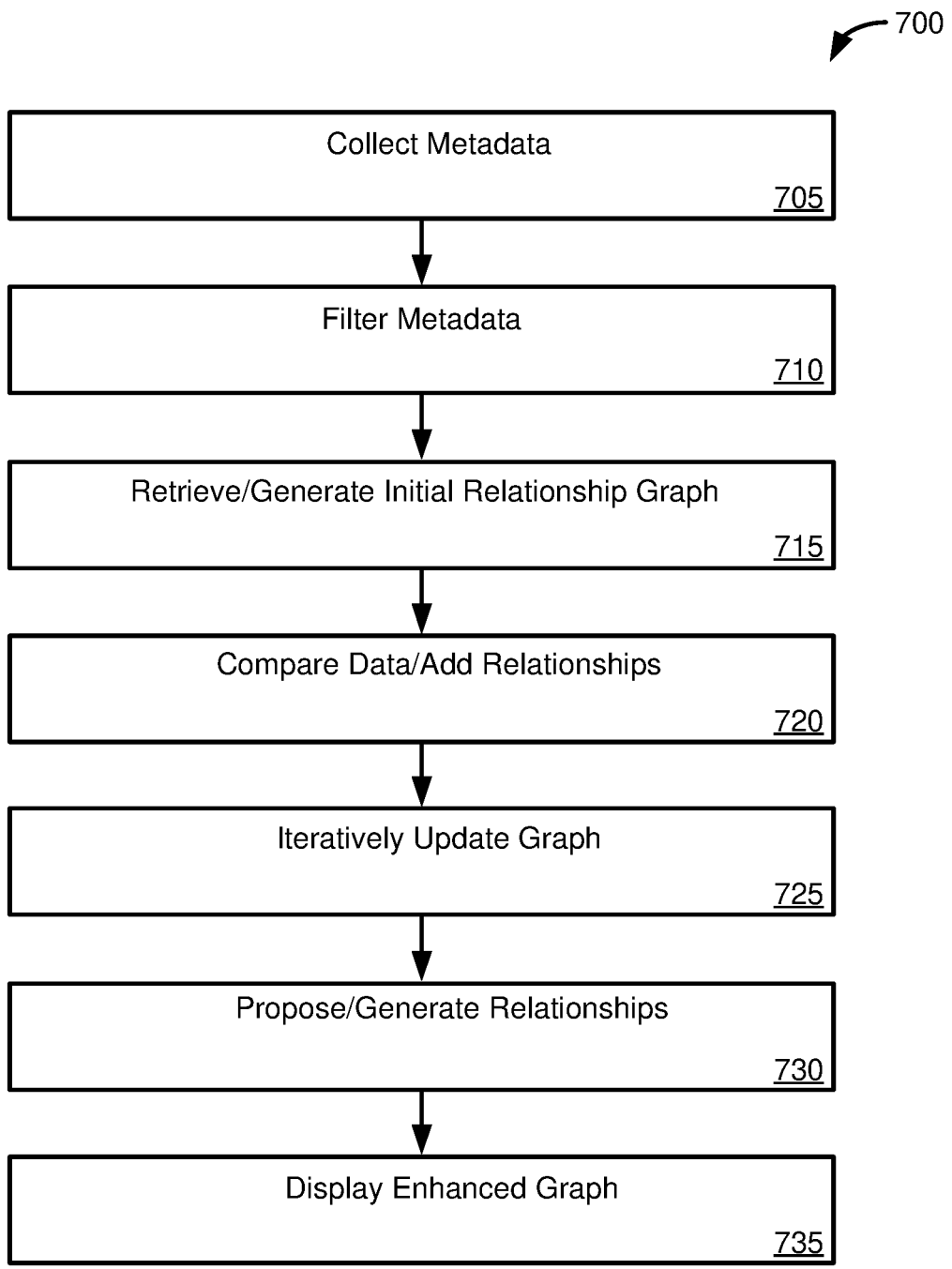
FIG. 7 is a flowchart of a process of enhancing a lineage graph with candidate data objects.

FIG. 7 provides a flowchart of a process 700 of the present disclosure for identifying a relationship between data objects. Metadata for data objects is collected at 705. Collecting metadata can include collecting information about available data objects, which can include candidate data objects as well as lineage data objects. Metadata can include information such as object identifiers, object attributes, attribute datatypes, and information about values in the data object, including for particular attributes thereof. For example, information about values in the data object can include cardinality information, entropy, variance, or maximum, minimum, or average values, or information about a distribution of values present in data for a given data object.

The metadata can be filtered at 710. Filtering metadata can include removing from consideration data objects or data object attributes that do not satisfy particular datatype requirements or whose entropy or variance do not satisfy threshold criteria. Filtering metadata at 710 can also include filtering metadata using provided processing criteria, such as identifying particular data sources or schemas that are, or are not, to be considered in a relationship identification process.

An initial relationship graph can be retrieved or generated at 715. The graph can be, for example, a lineage graph. The lineage graph may already be defined, or can be generated based on identified relationships between lineage data objects of the lineage graph.

Data for data objects, or particular attributes thereof, where the data can include metadata or actual data values for an instance of the data object, are compared at 720. The comparing can be performed as described, and can be used to generate various similarity measures. Relationships between the data objects can be established as part of the operations at 720.

A graph, such as a lineage graph or a graph that uses data for the lineage graph is iteratively updated at 725. Iteratively updating the graph can include adding a data object to the graph based on the operations at 720, the updated graph can then be analyzed again using the operations 720. Relationships can be proposed or generated at 730. That is, a graph can be updated to include additional data objects without formally establishing relationships between the data objects. The operations at 730 can include, for example, defining a join or a foreign key relationship between two data objects, or proposing such definitions to a user, where the user can then confirm whether the relationship should be implemented.

Optionally, an enhanced graph is displayed at 735, where the enhanced graph can correspond to the original lineage graph with any added data objects or data object relationships determined as part of the process 700.

Example 7—Example Relationship Identification Process

Figure 8:
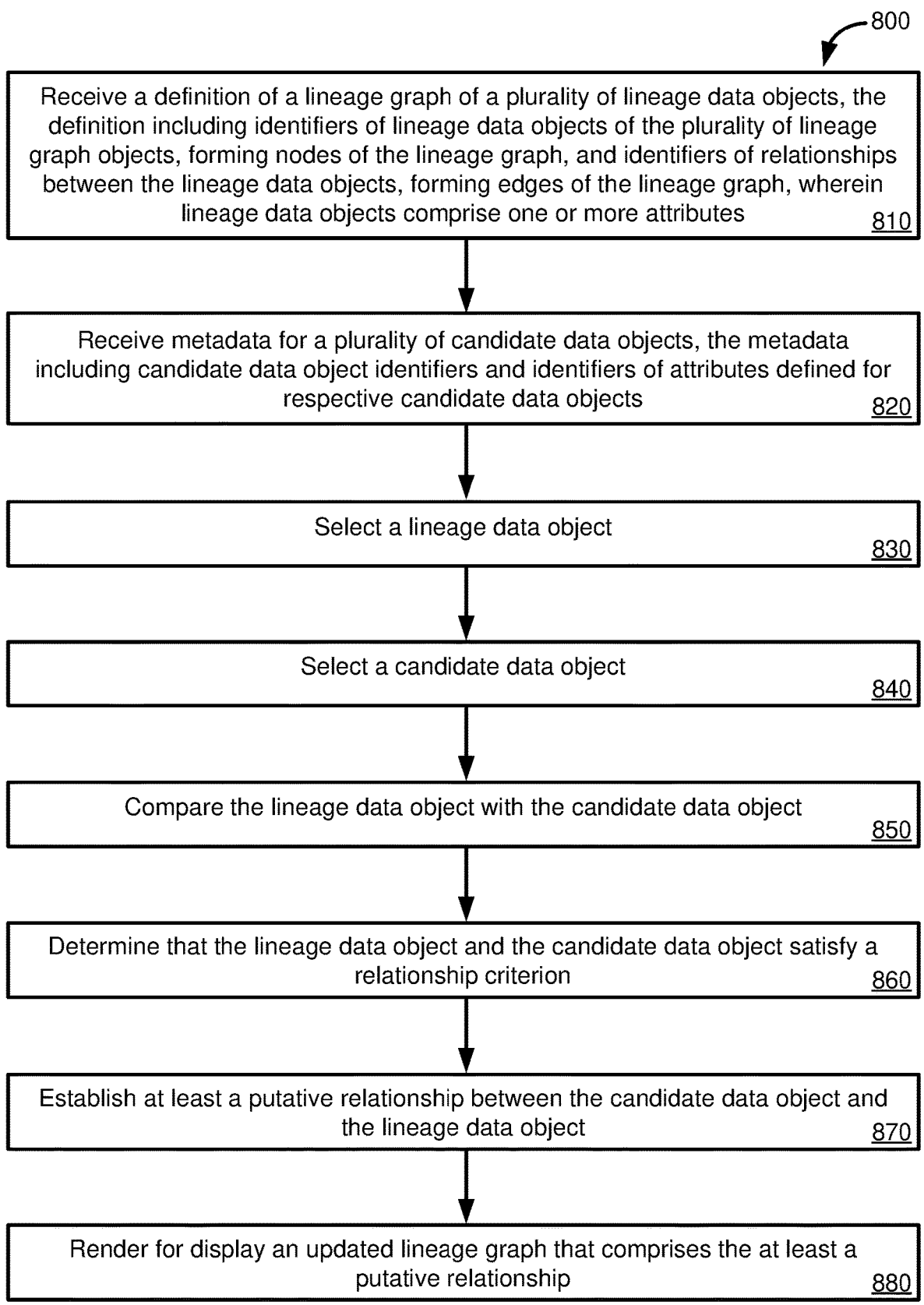
FIG. 8 is a flowchart of a process of identifying an at least putative relationship between a lineage data object and a candidate data object.

FIG. 8 is a flowchart of a process 800 of identifying an at least putative relationship between a lineage data object and a candidate data object. At 810, a definition of a lineage graph of a plurality of lineage data objects is received. The definition includes identifiers of lineage data objects of the plurality of lineage data objects, forming nodes of the lineage graph, and identifiers of relationships between the plurality of lineage data objects, forming edges of the lineage graph, where lineage data objects include one or more attributes.

At 820, metadata is received for a plurality of candidate data objects. The metadata includes candidate data object identifiers and identifiers of attributes defined for respective candidate data objects. A lineage data object is selected at 830, and a candidate data object is selected at 840. At 850, the lineage data object is compared with the candidate data object. It is determined at 860 that the lineage data object and the candidate data object satisfy a relationship criterion. At 870, at least a putative relationship between the candidate data object and the lineage data object is established. An updated lineage graph that comprises the at least a putative relationship is rendered for display at 880.

Example 8—Computing Systems

Figure 9:
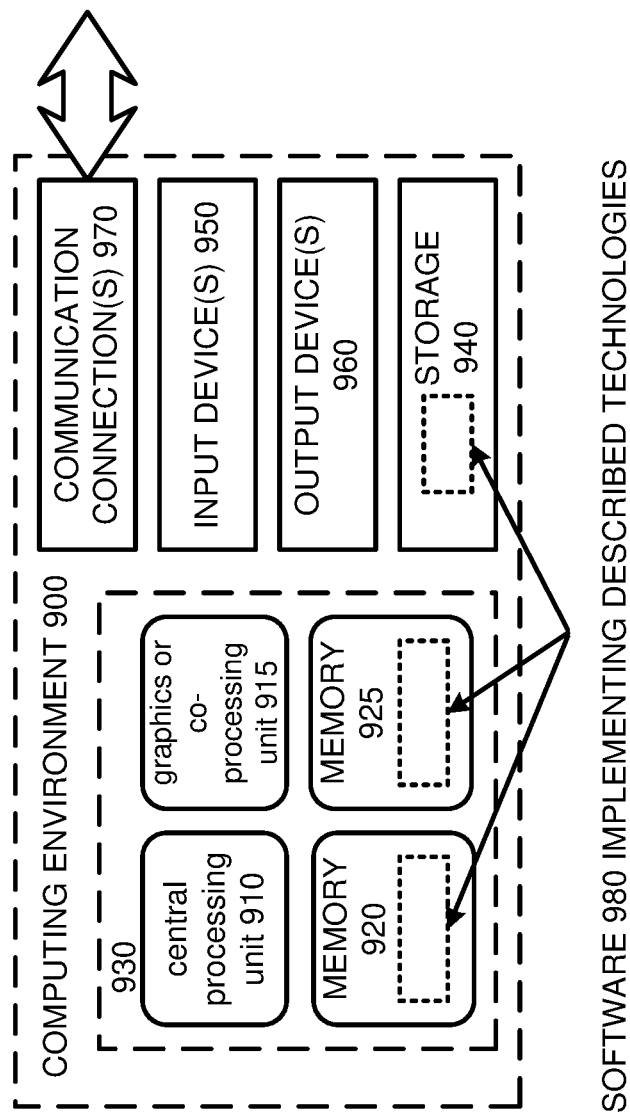
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing a database environment, and associated methods, described in Examples 1-7. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way, and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 10:
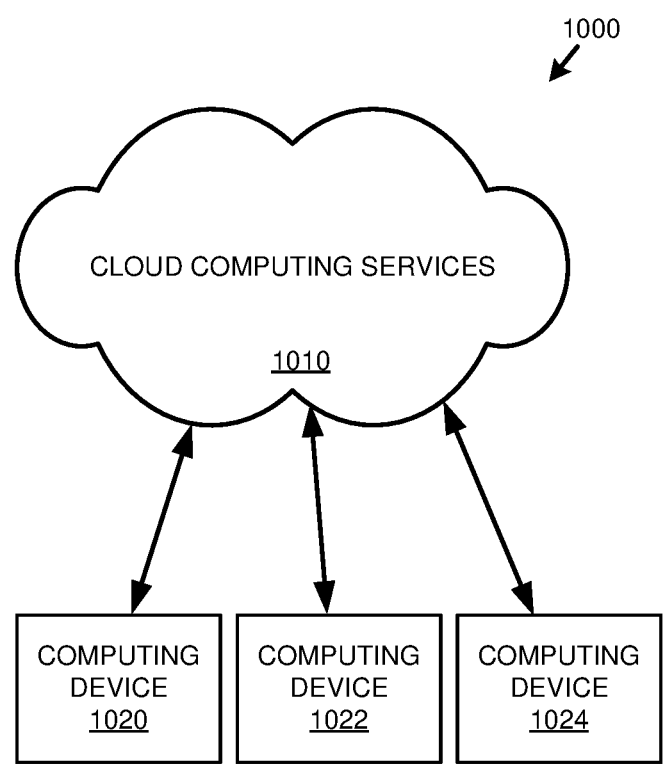
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processor units coupled to the at least one memory; and
   one or more computer readable storage media storing computer-executable instructions that, when executed, cause the computing system to perform operations comprising:
      receiving a definition of a lineage graph of a plurality of lineage data objects, the definition comprising identifiers of lineage data objects of the plurality of lineage data objects, forming nodes of the lineage graph, and identifiers of relationships between the plurality of lineage data objects, forming edges of the lineage graph, wherein lineage data objects comprise one or more attributes associated with corresponding attribute values for at least a portion of the one or more attributes;
      receiving metadata for a plurality of candidate data objects, the metadata comprising candidate data object identifiers and identifiers of attributes, wherein data objects of the candidate data objects comprises values for at least a portion of the attributes defined for respective candidate data objects and wherein the metadata further comprises attribute properties including at least one of data types, cardinality, or statistical measures associated with the attributes, including a set of a plurality of values for a given attribute, wherein an attribute property defines characteristics of the attribute or the set of a plurality of attribute values and is not a value of the attribute;
      iteratively, for data objects of the candidate data objects;
         selecting a lineage data object;
         selecting a candidate data object using metadata retrieved from a metadata catalog maintained by the computing system;
         comparing the lineage data object with the candidate data object using at least one attribute property of the candidate data object and a corresponding attribute property of the lineage data object;

determining that the lineage data object and the candidate data object satisfy a relationship criterion;

establishing at least a putative relationship between the candidate data object and the lineage data object; and in response to the establishing at least a putative relationship for at least one candidate data object, performing one or more of:
(A) modifying a query join condition based on the at least a putative relationship to reduce data processing overhead;
(B) prioritizing direct over indirect relationships in a lineage graph to optimize query execution;
(C) reducing data transfer volume by selecting a data source associated with the at least a putative relationship that requires less data movement; or
(D) automating schema mapping across different datasets by inferring attribute correspondences from metadata properties.

2. The computing system of claim 1, wherein comparing the lineage data object with the candidate data object comprises:
comparing an attribute property or an attribute definition of an attribute of the lineage data object with an attribute property or an attribute definition of an attribute of the candidate data object.

3. The computing system of claim 1, wherein comparing the lineage data object with the candidate data object comprises:
comparing metadata-derived summary information for an attribute of the lineage data object with metadata-derived summary information for an attribute of the candidate data object.

4. The computing system of claim 3, wherein the summary information comprises entropy or variance of values in the attribute of the lineage data object and the attribute of the candidate data object.

5. The computing system of claim 3, wherein the summary information comprises a number of values for the attribute in an instance of the lineage data object and a number of values for the attribute in an instance of the candidate data object.

6. The computing system of claim 3, wherein the summary information comprises a number of unique values for the attribute in an instance of the lineage data object and a number of unique values for the attribute in an instance of the candidate data object.

7. The computing system of claim 1, wherein the metadata catalog is a first metadata catalog and the comparing the lineage data object with the candidate data object comprises comparing a first value of a precomputed or retrieved metric stored in a second metadata catalog metric, wherein the second metadata catalog is the first metadata catalog or is a different metadata catalog, or generated at least in part from a plurality of values for at least one attribute of the lineage data object with a second value of the metric or the candidate data object.

8. The computing system of claim 7, wherein the first value of the metric is a statistical value generated from values of an instance of a respective lineage data object or candidate date object.

9. The computing system of claim 7, wherein the first value of the metric is a statistical value generated by comparing respective attribute values for respective instances of the lineage data object and the candidate data object.

10. The computing system of claim 1, wherein comparing the lineage data object with the candidate data object comprises comparing attribute values for an attribute of an instance of the lineage data object with a combination of values for multiple attributes of an instance of the candidate data object.

11. The computing system of claim 1, wherein comparing the lineage data object with the candidate data object comprises comparing attribute values for an attribute of an instance the lineage data object with a result of performing a mathematical operation on values for an attribute of an instance of the candidate data object.

12. The computing system of claim 1, wherein the at least a putative relationship comprises a foreign key relationship or a join.

13. The computing system of claim 1, wherein at least a portion of the relationships between the plurality of lineage data objects correspond to foreign key relationships, joins, or associations.

14. The computing system of claim 1, wherein the plurality of lineage data objects are associated with multiple software programs or layers.

15. The computing system of claim 1, the operations further comprising:
after the establishing the at least a putative relationship, considering the candidate data object as part of the lineage graph and performing one or more additional operations of the selecting a lineage data object, selecting a candidate data object, and comparing the lineage data object with the candidate data object.

16. The computing system of claim 1, wherein the relationship criterion comprises a relationship threshold defined with respect to a first metric that compares information for one or more attributes of the lineage data object with information for one or more attributes of the candidate data object.

17. The computing system of claim 1, wherein establishing at least a putative relationship between the candidate data object and the lineage data object comprises assigning a score to the at least putative relationship.

18. The computing system of claim 1, the operations further comprising:
receiving user input defining a lineage graph edge corresponding to the putative relationship, the user input comprising at least one filtering, aggregation, data combination, or data transformation operation.

19. A method, implemented in a computing system comprising at least one hardware processor and at least one memory coupled to the at least one hardware processor, the method comprising:
receiving a definition of a lineage graph of a plurality of lineage data objects, the definition comprising identifiers of lineage data objects of the plurality of lineage data objects, forming nodes of the lineage graph, and identifiers of relationships between the plurality of lineage data objects, forming edges of the lineage graph, wherein lineage data objects comprise one or more attributes associated with corresponding attribute values for at least a portion of the one or more attributes;

receiving metadata for a plurality of candidate data objects, the metadata comprising candidate data object identifiers and identifiers of attributes, wherein data objects of the candidate data objects comprises values for at least a portion of the attributes defined for respective candidate data objects and wherein the metadata further comprises attribute properties including at least one of data types, cardinality, or statistical measures associated with the attributes, including a set of a plurality of values for a given attribute, wherein an attribute property defines characteristics of the attribute or the set of a plurality of attribute values and is not a value of the attribute;
iteratively, for data objects of the candidate data objects;
selecting a lineage data object;
selecting a candidate data object using metadata retrieved from a metadata catalog maintained by the computing system;
comparing the lineage data object with the candidate data object using on at least one attribute property of the candidate data object and a corresponding attribute property of the lineage data object;
determining that the lineage data object and the candidate data object satisfy a relationship criterion;
establishing at least a putative relationship between the candidate data object and the lineage data object; and
in response to the establishing at least a putative relationship for at least one candidate data object, performing one or more of:
(A) modifying a query join condition based on the at least a putative relationship to reduce data processing overhead;
(B) prioritizing direct over indirect relationships in a lineage graph to optimize query execution;
(C) reducing data transfer volume by selecting a data source associated with the at least a putative relationship that requires less data movement; or
(D) automating schema mapping across different datasets by inferring attribute correspondences from metadata properties.

20. One or more computer-readable storage media comprising:
computer-executable instructions that, when executed by a computing system comprising at least one hardware processor and at least one memory coupled to the at least one hardware processor, cause the computing system to receive a definition of a lineage graph of a plurality of lineage data objects, the definition comprising identifiers of lineage data objects of the plurality of lineage data objects, forming nodes of the lineage graph, and identifiers of relationships between the plurality of lineage data objects, forming edges of the lineage graph, wherein lineage data objects comprise one or more attributes associated with corresponding attribute values for at least a portion of the one or more attributes;
computer-executable instructions that, when executed by the computing system, cause the computing system to receive metadata for a plurality of candidate data objects, the metadata comprising candidate data object identifiers and identifiers of attributes, wherein data objects of the candidate data objects comprises values for at least a portion of the attributes defined for respective candidate data objects and wherein the metadata further comprises attribute properties including at least one of data types, cardinality, or statistical measures associated with the attributes, including a set of a plurality of values for a given attribute, wherein an attribute property defines characteristics of the attribute or the set of a plurality of attribute values and is not a value of the attribute;
computer-executable instructions that, when executed by the computing system, cause the computing system to iteratively, for data objects of the candidate data objects:
select a lineage data object using metadata retrieved from a metadata catalog maintained by the computing system;
select a candidate data object;
compare the lineage data object with the candidate data object using at least one attribute property of the candidate data object and a corresponding attribute property of the lineage data object;
determine that the lineage data object and the candidate data object satisfy a relationship criterion;
establish at least a putative relationship between the candidate data object and the lineage data object; and
computer-executable instructions that, when executed by the computing system, cause the computing system to, in response to the establishing at least a putative relationship, perform one or more of:
(A) modifying a query join condition based on the at least a putative relationship to reduce data processing overhead;
(B) prioritizing direct over indirect relationships in a lineage graph to optimize query execution;
(C) reducing data transfer volume by selecting a data source associated with the at least a putative relationship that requires less data movement; or
(D) automating schema mapping across different datasets by inferring attribute correspondences from metadata properties.

* * * * *